US008675480B2

(12) United States Patent
Hartless

(10) Patent No.: US 8,675,480 B2
(45) Date of Patent: Mar. 18, 2014

(54) COMMUNICATIONS SYSTEM PROVIDING ENHANCED CHANNEL SWITCHING FEATURES BASED UPON MODULATION FIDELITY AND RELATED METHODS

(75) Inventor: Mac Lamar Hartless, Forest, VA (US)

(73) Assignee: Harris Corporation, Melbourne, FL (US)

( * ) Notice: Subject to any disclaimer, the term of this patent is extended or adjusted under 35 U.S.C. 154(b) by 135 days.

(21) Appl. No.: 13/196,156

(22) Filed: Aug. 2, 2011

(65) Prior Publication Data
US 2013/0033980 A1   Feb. 7, 2013

(51) Int. Cl.
*H04L 12/26* (2006.01)
*H04W 4/00* (2009.01)

(52) U.S. Cl.
USPC ............................. 370/228; 370/329; 370/331

(58) Field of Classification Search
USPC .................. 370/228, 203–211, 264, 329, 331
See application file for complete search history.

(56) References Cited

U.S. PATENT DOCUMENTS

| | | | |
|---|---|---|---|
| 5,553,243 A | 9/1996 | Harrison et al. ............... 375/224 |
| 5,761,240 A | 6/1998 | Croucher, Jr. .................. 375/224 |
| 7,096,015 B2 | 8/2006 | Bridges et al. ............... 455/432.1 |
| 7,136,633 B2 | 11/2006 | Daly .............................. 455/418 |
| 7,167,706 B2 | 1/2007 | Denenberg et al. ......... 455/432.1 |
| 7,209,761 B2 | 4/2007 | Thandu .......................... 455/517 |
| 7,266,371 B1 | 9/2007 | Amin et al. .................... 455/419 |
| 7,319,874 B2 | 1/2008 | Rautiola et al. ................ 455/455 |
| 7,340,251 B1 | 3/2008 | McClure ........................ 455/434 |
| 7,379,436 B2 | 5/2008 | Jiang .............................. 370/328 |
| 7,447,176 B2 | 11/2008 | Ruan et al. ..................... 370/331 |
| 7,447,499 B2 | 11/2008 | Bridges et al. ................. 455/419 |
| 7,496,090 B2 | 2/2009 | Jiang .............................. 370/354 |
| 7,496,362 B2 | 2/2009 | Wolfman et al. ........... 455/432.1 |
| 7,502,626 B1 | 3/2009 | Lemilainen ................. 455/554.2 |
| 7,509,125 B2 | 3/2009 | Vuong et al. ................... 455/434 |
| 7,573,846 B2 | 8/2009 | Rue et al. ....................... 370/329 |
| 7,580,720 B2 | 8/2009 | Thandu .......................... 455/517 |
| 7,673,036 B1 | 3/2010 | Tolbert, Jr. ..................... 709/224 |
| 7,706,336 B2 | 4/2010 | Sheynman et al. ............ 370/338 |
| 7,835,951 B1 | 11/2010 | Burger et al. .................... 705/28 |
| 7,869,826 B2 | 1/2011 | McElwain et al. ............. 455/551 |
| 7,881,717 B2 | 2/2011 | Denenberg et al. ......... 455/435.1 |
| 2003/0174669 A1* | 9/2003 | Roh et al. ....................... 370/328 |
| 2004/0218568 A1 | 11/2004 | Goodall et al. |
| 2005/0276252 A1* | 12/2005 | Sizeland et al. ............... 370/338 |
| 2007/0010241 A1* | 1/2007 | Wachter et al. ................ 455/423 |

(Continued)

OTHER PUBLICATIONS

"*Error Vector Magnitude*" Wikipedia.org, printed Apr. 28, 2011.
"*Analyzing Signals Using the Eye Diagram*" High Frequency Electronics; Nov. 2005.

(Continued)

*Primary Examiner* — Christopher Grey
*Assistant Examiner* — M Mostazir Rahman
(74) *Attorney, Agent, or Firm* — Allen, Dyer, Doppelt, Milbrath, Gilchrist, P.A.

(57) ABSTRACT

A wireless communications system includes a base station, and a communications device configured to communicate with the base station via different wireless communications channels using a modulation standard wherein a received modulation differs from a transmitted modulation (e.g., due to environmental conditions) as measured by a modulation fidelity value. The base station and the communications device are configured to cooperate to determine respective modulation fidelity values associated with a current channel and an alternate channel based upon an estimated modulation fidelity calculated from the received modulation, and to selectively switch between the current channel and the alternate channel based upon the determined modulation fidelity values.

14 Claims, 8 Drawing Sheets

(56) References Cited

U.S. PATENT DOCUMENTS

| | | |
|---|---|---|
| 2007/0046536 A1* | 3/2007 | Jia et al. .................. 342/357.12 |
| 2007/0157065 A1* | 7/2007 | Pons et al. .................... 714/758 |
| 2009/0028257 A1* | 1/2009 | Mukkavilli et al. ........... 375/260 |
| 2009/0122846 A1* | 5/2009 | Kolze et al. ................... 375/222 |
| 2012/0129480 A1* | 5/2012 | Ruelke et al. ................. 455/296 |
| 2012/0135777 A1* | 5/2012 | Karpoor et al. ............... 455/522 |

OTHER PUBLICATIONS

"*Application Note: Understanding Advanced P25 Control Channel Functions*" www.aeroflex.com.

"*Application Note: Understanding P25 Modulation Fidelity*" www.aeroflex.com.

"*Application Note: Understanding 800 MHz and VHF/UHF Implicit P25 Trunking Functions using the IFR 2975*" www.acroflex.com.

\* cited by examiner

COMMUNICATIONS SYSTEM PROVIDING ENHANCED CHANNEL SWITCHING FEATURES BASED UPON MODULATION FIDELITY AND RELATED METHODS

FIELD OF THE INVENTION

The present invention relates to the field of communications systems and, more particularly, to wireless communications systems and related methods.

BACKGROUND OF THE INVENTION

Wireless communications systems continue to grow in popularity and utilization. One such example is cellular networks, which continue to grow worldwide and add ever expanding coverage areas and enhanced cellular communications formats to increase bandwidth and data communication rates.

Another important area of wireless communications is governmental communications systems, which are particularly important for disaster and emergency response operations. Typically, trunked radio systems are used for such applications, as they allow for a given number of channels (i.e., communications frequencies) to be used to establish numerous talk groups. A control channel sends packets of data to enable talk group members to communicate with one another, regardless of frequency. This advantageously allows many people to conduct conversations over a relatively small number of frequencies. By way of example, trunking systems are used to provide two-way communication for fire departments, police and other municipal services, who all share spectrum allocated to a city, county, or other entity.

One such example of a trunked radio frequency (RF) communication system is described in U.S. Pat. No. 5,553,243 to Harrison et al. This patent describes an approach for determining the fidelity of communications over a communications channel. Portable/mobile radios freely roaming between multiple trunked RF communications sites calculate the fidelity of communications received over current and alternate channels with comprehensive, high bit error resolution using a weighted average error dispersion procedure. The weighted average error dispersion analysis generates, for each group of redundant messages (and in some instances sub-preamble bits) received by a roaming radio in each message frame, a weighted average error dispersion number whose incrementally increasing magnitude reflects deteriorating signal fidelity. Decisions about switching to alternate communications channels are made by the roaming radio based on the incrementally changing weighted error dispersion number.

A relatively new approach to trunked radio for governmental use is being developed as Project 25 (P25), or APCO-25, which encompasses a suite of standards for digital radio communications for use by federal, state/province and local public safety agencies in North America to enable them to communicate with other agencies and mutual aid response teams in emergencies. P25 takes advantage of the technological advances and expanded capabilities of digital radio.

Despite the existence of systems such as P25, further enhancements for wireless communications systems may be desirable in some applications.

SUMMARY OF THE INVENTION

A wireless communications system is provided herein which includes at least one base station, and one or more communications devices configured to communicate with the base stations via a plurality of different wireless communications channels using a modulation standard wherein a received modulation differs from a transmitted modulation as measured by a modulation fidelity value. The communication devices are configured to determine respective modulation fidelity values associated with a current channel and an alternate channel based upon the modulation fidelity measured between the transmitted modulation and the received modulation for the current channel and the alternate channel, and to selectively switch between the current channel and the alternate channel based upon the determined modulation fidelity values. As such, the system may advantageously allow for relatively quick assessment of alternate channel conditions, to thereby reduce channel switching delay.

More particularly, the communications device may be configured to determine the modulation fidelity values based upon an RMS frequency deviation error. Additionally, the communications device may be further configured to generate a bit error rate (BER) estimate for the current channel based upon the determined modulation fidelity values and a pre-determined calibration curve.

The base station and the communications device(s) are further configured to cooperate to determine positions of the best modulation fidelity (i.e., lowest RMS frequency deviation error) for the current channel and alternate channels at respective symbol sample points, and to determine the respective modulation fidelity values at the determined positions. For example, the communications device may be further configured to determine the modulation fidelity based upon an average of measured frequency deviation errors at the determined positions. The communications device may be further configured to determine the modulation fidelity based upon error vector magnitudes (EVMs).

A related communications device, such as the one described briefly above, and a related communications method are also provided. The communications method includes causing at least one communications device to communicate with at least one base station via a current wireless communications channel from among a plurality of different wireless communications channels using a modulation standard, wherein a received modulation differs from a transmitted modulation as measured by a modulation fidelity value. The method further includes determining respective modulation fidelity values associated with the current channel and an alternate channel based upon a RMS frequency deviation error between the received modulation and the transmitted modulation for each channel, and selectively switching between the current channel and the alternate channel based upon the determined modulation fidelity values.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in different embodiments.

Figure 1:
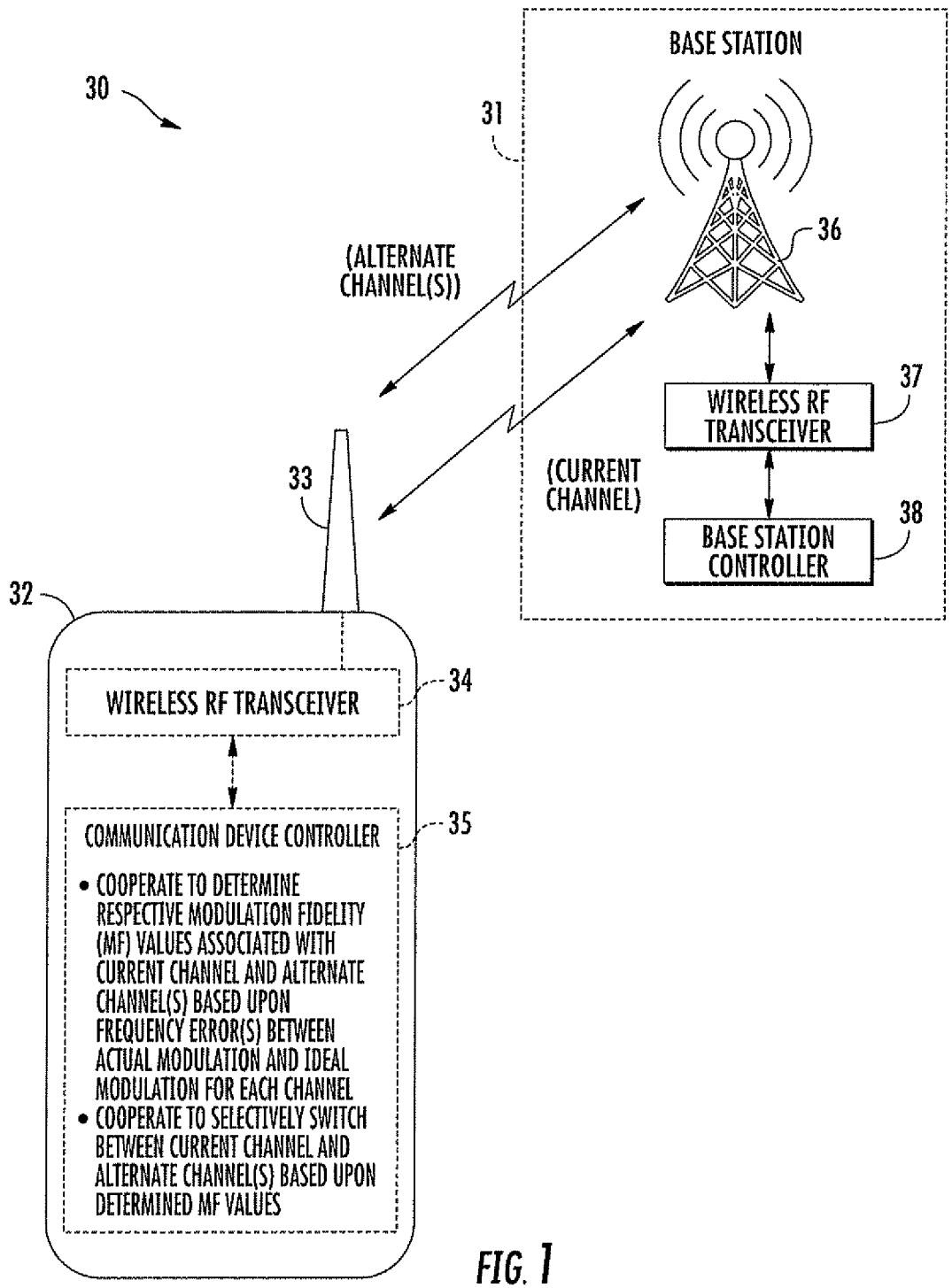
FIG. 1 is a schematic block diagram of a wireless communications system in accordance with the invention.

Referring initially to FIG. 1, a wireless communications system 30 illustratively includes one or more base stations 31 and one or more communications devices 32. The base station 31 and communications device 32 are configured to communicate with one another via a plurality of different wireless communications channels using a modulation standard wherein the received modulation differs from the transmitted modulation as measured by a modulation fidelity value. By way of example, one such modulation standard that may be used by the system 30 is P25 (also known as APCO-25). As noted above, P25 provides for digital radio communications by federal, state/province and local public safety agencies in North America to enable communications with other agencies and mutual aid response teams in emergencies. The examples provided herein are made with reference to the P25 modulation standard, but it will be appreciated by the skilled artisan that the system and method aspects set forth herein may also be used with other wireless communication standards or protocols (e.g., the European TETRA protocol, cellular communications, etc.). In accordance with P25 Phase 2, pi/4 DUSK is used as the downlink modulation standard, although here again other modulation standards may be used in different applications. The P25 Phase 2 standard is further described in the document entitled "Project 25 Phase 2 Two-Slot Time Division Multiple Access Physical Layer Protocol Specification", TIA-102.BBAB, July 2009.

In the illustrated example, the communications device 32 includes one or more antennas 33, one or more wireless RF transceivers 34 coupled to the antenna, and a controller 35 coupled to the wireless RF transceiver. The wireless RF transceiver 34 may be configured to operate in accordance with one or more of the communications formats noted above, for example. The controller 35 may be implemented using a combination of hardware (e.g., processor, memories, signal processing circuitry, etc.) and software (e.g., a computer-readable medium having computer-executable instructions for performing the functions or operations described herein). In accordance with one example implementation, the communications device 32 is based upon a multimode handheld radio, such as a P7300 dual-band multimode radio from the present assignee Harris Corporation, of Melbourne, Fla., although other types of communications devices may be used depending on the given communications format.

Furthermore, the base station 31 illustratively includes one or more antennas (illustrated by a communications tower 36), a wireless RF transceiver(s), and a base station controller 38. It should be noted that, even though a communications tower is shown in FIG. 1, the base station 31 may be a mobile device in some embodiments. Moreover, the various components of the base station 31 need not be geographically co-located in all instances. For example, some base station control operations may be performed remotely (e.g., at a network operating center, etc.).

One potential problem with P25 and other mobile wireless networks is that of roaming between base stations (also known as sub-stations) or channels due to changing environmental conditions. Generally speaking, it is desirable to minimize the time required to estimate environmental conditions and select the best channel/base station for reliable communication, as time spent checking signal quality on alternate channels takes away from available data transmission time. Current metrics for grading channels typically focus on Received Signal Strength Indicators (RSSIs) or digital error rates (e.g., bit error rate (BER), signal error rate (SER), or block error rate (BLER)).

With respect to RSSI, this provides a good indication as to which channel is broadcasting the strongest signal. However, a stronger signal does not always translate to more reliable data communication. For example, although one channel may have a higher RSSI than another channel, the channel with the higher RSSI may be subject to a higher level of interference and/or multi-path than the other channel providing the "weaker" signal, and thus be less reliable than the other channel despite the higher RSSI. While a digital error rate is more indicative of reliability, digital error rate calculations typically require a relatively long period to calculate, which for a large number of available channels may therefore require a long amount of time to measure, and thereby diminish data transmission time to undesirable levels. Moreover, digital error rate determinations also typically require symbol synchronization information to be available, which is not always the case when measuring additional channels other than the current channel being used for communication.

Generally speaking, the system 30 and methods described herein estimate channel conditions for use in making roaming or channel switching decisions based upon an estimated modulation fidelity metric, which may advantageously be determined over a relatively short time duration. Since the modulation fidelity metric may be estimated over a relatively short duration of time, the delay between detecting that the current channel you are on is not yielding the best communication quality and switching to a better channel may therefore be minimized. Modulation fidelity estimation may be visually represented using eye pattern diagrams, which may conceptually be understood as an "oscilloscope view" of a repetitively sampled digital signal. As such, various eye pattern diagrams are referenced in the following description to illustrate the measurements and calculations being performed to determine modulation fidelity estimates.

Figure 3:
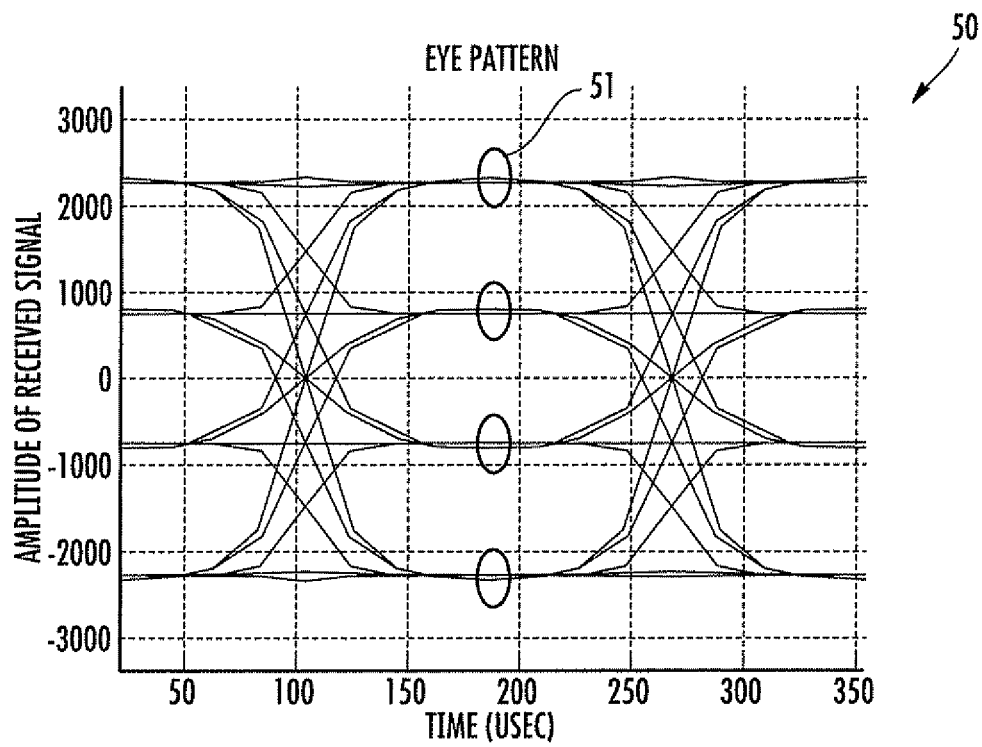
FIG. 3 is an eye pattern diagram of received signal amplitude vs. time showing ideal modulation characteristics for sampled signals from the system of FIG. 1.
Figure 4:
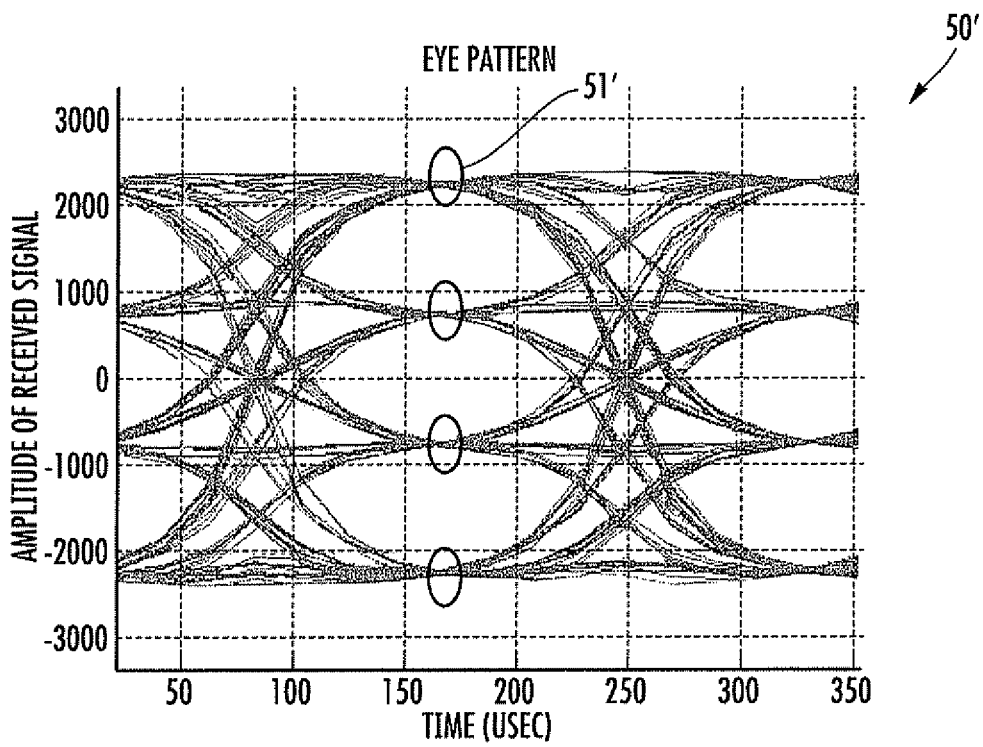
FIG. 4 is an eye pattern diagram similar to that of FIG. 3 further showing the effects of additional filtering in the receiver for sampled signals from the system of FIG. 1.

Referring additionally to FIG. 3, an eye pattern diagram 50 is shown for a relatively strong signal with a low frequency deviation error as measured at the symbol points (indicated by ovals 51). In this regard, the eye pattern diagram 50 represents a close approximation of the ideal transmitted modulation, as there is little deviation (e.g., root mean square (RMS) error) from the expected frequency values at the symbol points. However, as additional filtering is introduced to compensate for the effects of noise and interference at the receiver, the RMS frequency deviation error at the symbol points becomes more pronounced, as seen in the eye pattern diagram 50' of FIG. 4 at the symbol points (indicated by ovals 51'). In this way, modulation fidelity values may be used to measure a difference between the received modulation (e.g., as shown in FIG. 4) from the transmitted modulation (e.g., as shown in FIG. 3).

In the examples and eye pattern diagrams provided herein, the symbol points occur at the position where the eye opening is the largest (i.e., at the center of the eye). This provides a convenient point for RMS frequency error measurement which will yield a modulation fidelity estimate, as symbol synchronization algorithms may be configured to find or lock on to this point in the signal transmission for signal synchronization, as this is where the RMS frequency error will be at its lowest. However, it should be noted that frequency error determination may be performed at other points in some embodiments. Determination of symbol positions will be discussed further below with reference to FIG. 9.

Figure 5:
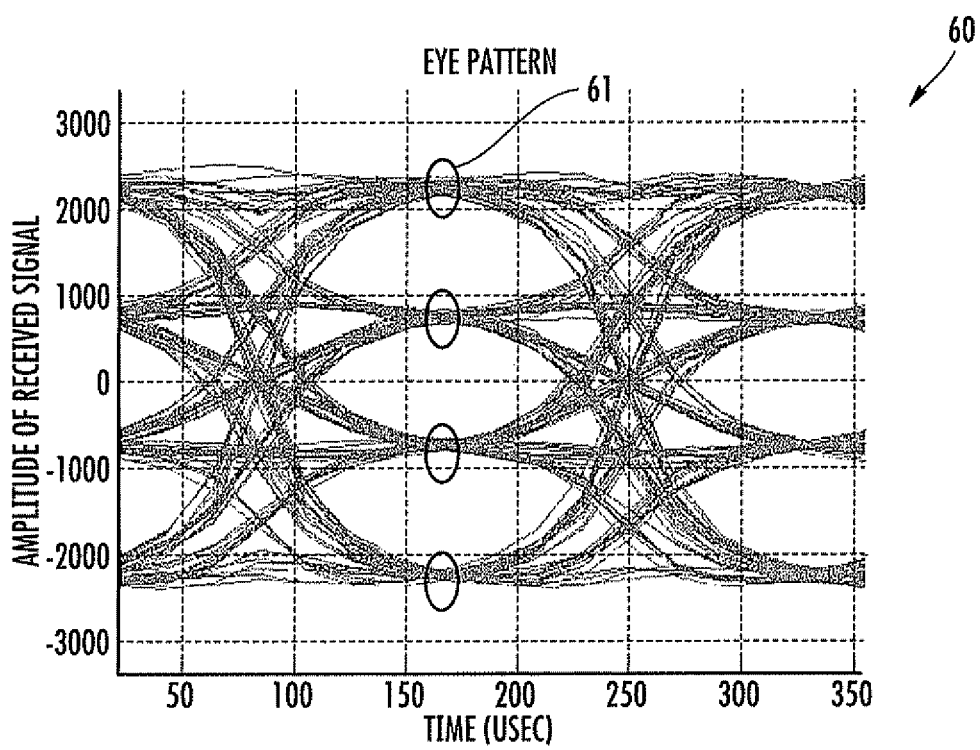
FIGS. 5 and 6 are eye pattern diagrams similar to that of FIG. 4 further showing the effects of decreasing signal to interference ratios for sampled signals from the system of FIG. 1.
Figure 6:
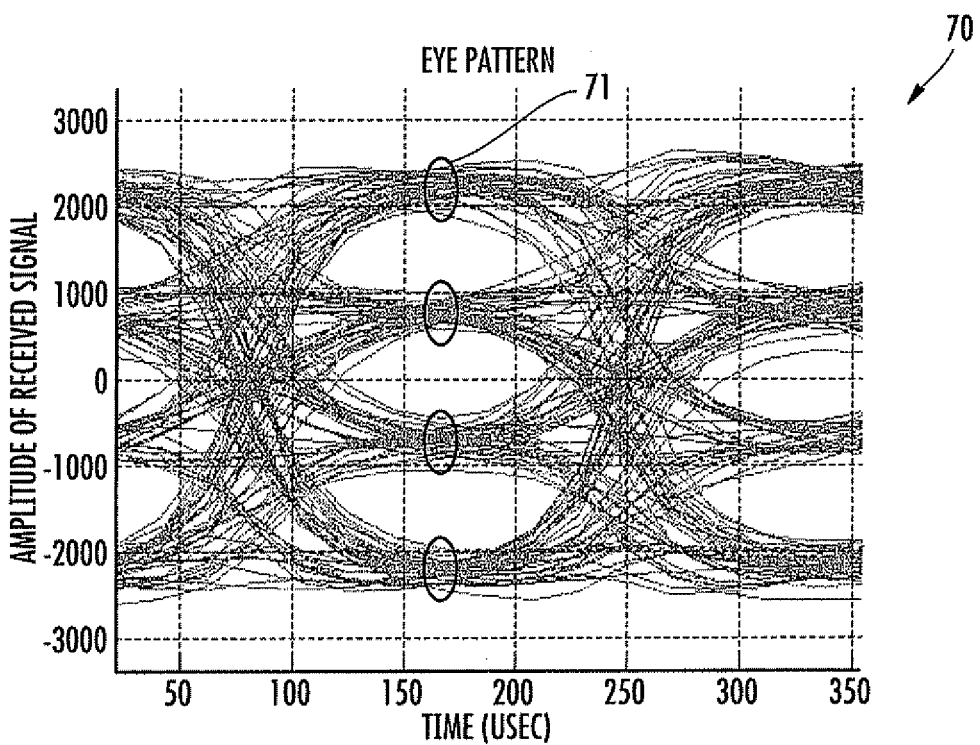

Referring additionally to FIGS. 5 and 6, the effects of varying signal to interference (S/I) ratios can be seen on modulation fidelity. Generally speaking, as the S/I ratio decreases, the modulation fidelity worsens, which is reflected by the decreasing opening of the eye pattern. In the eye pattern diagram 60 of FIG. 5, there is an S/I ratio of 25 dB, and in the eye pattern diagram 70 of FIG. 6 there is an S/I ratio of 15 dB. Accordingly, it may be seen that the width of the signal lines at the symbol points in FIG. 5 (indicated by ovals 61) is narrower than at the symbol points in FIG. 6 (indicated by ovals 71), and thus that there is a better modulation fidelity with respect to the eye pattern diagram 60 than with respect to the eye pattern diagram 70.

Figure 7:
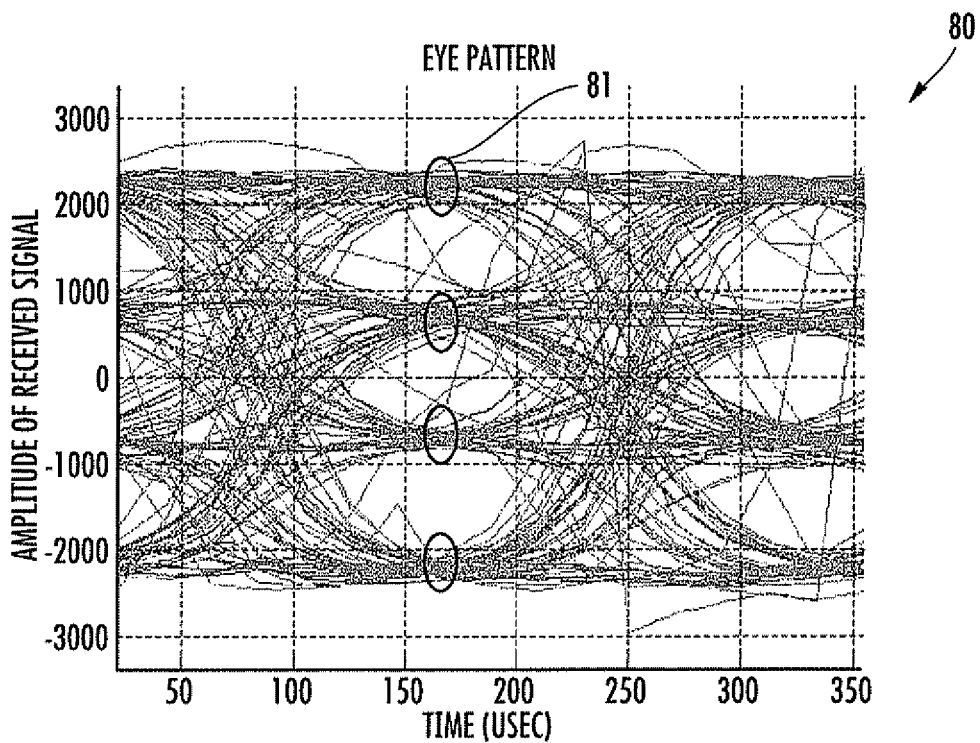
FIGS. 7 and 8 are eye pattern diagrams similar to that of FIG. 4 further showing the effects of increased delay spread for sampled signals from the system of FIG. 1.
Figure 8:
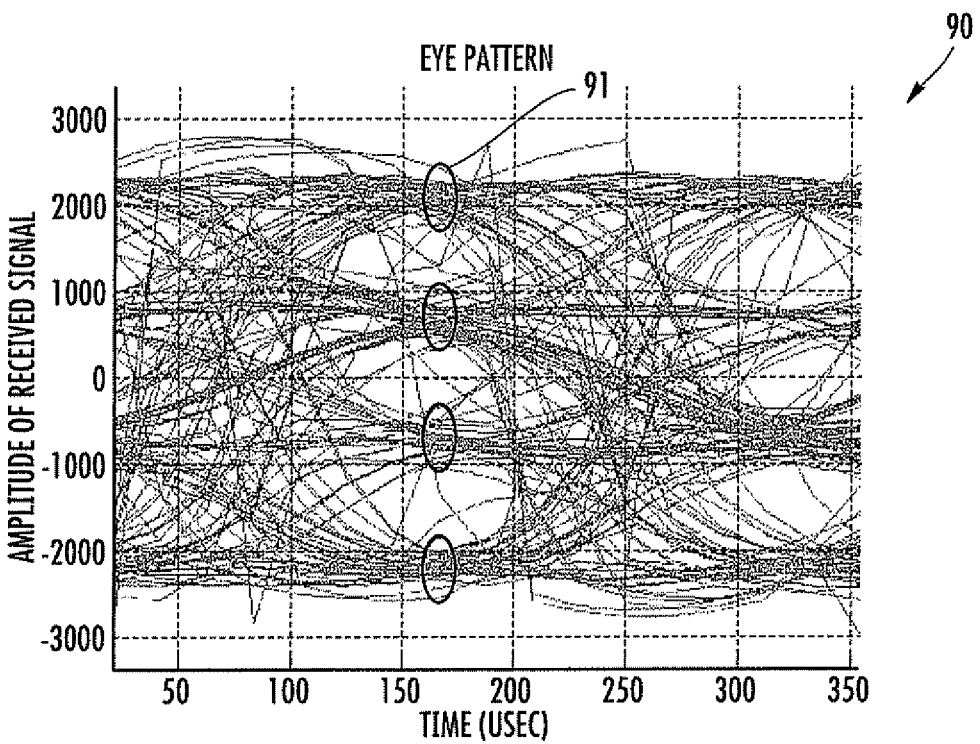

Similarly, the effects of delay spread on eye patterns may be seen in FIGS. 7 and 8. More particularly, a 50 μs delay spread is present in the eye pattern diagram 80 of FIG. 7, and a 75 μs delay spread is present in the eye pattern diagram 90 of FIG. 8. As may be seen, the higher delay spread (eye pattern diagram 90) results in a reduced eye opening, as shown by higher RMS errors at the symbol points (indicated by ovals 81 in FIG. 7 and ovals 91 in FIG. 8).

Figure 2:
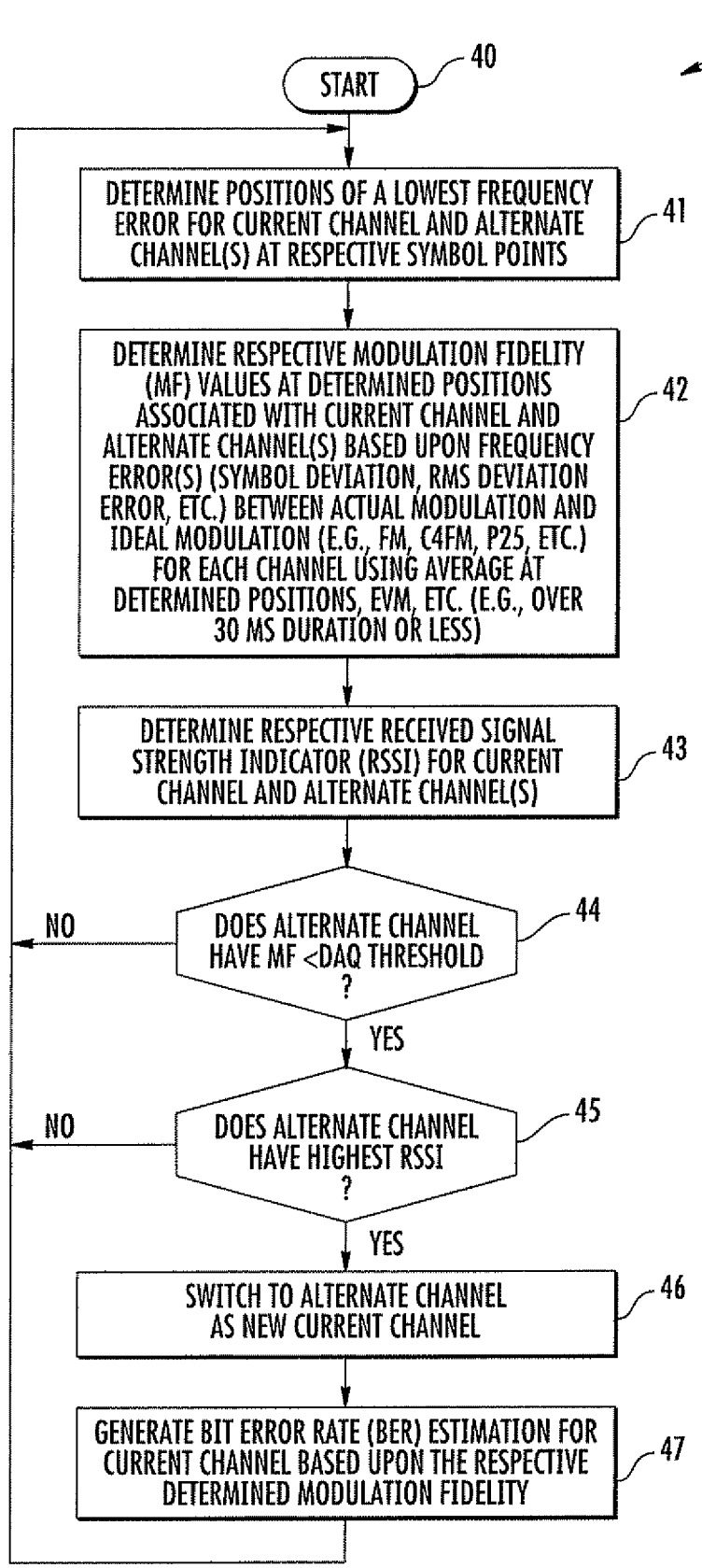
FIG. 2 is a flow diagram illustrating method aspects associated with the system of FIG. 1.

With reference now to the flowchart 39 of FIG. 2, beginning at Block 40, after the determination of the symbol point locations by the communications device 32, at Block 41, the communications device 31 determines respective modulation fidelity values associated with a current channel and one or more alternate channels based upon an RMS frequency error between the received modulation and the transmitted modulation for each channel, at Block 42. For example, the base station 31 may transmit signals with known FM signal characteristics (e.g., carrier frequency, symbol synchronization, etc.) which may be communicated to the communications device 32 via a control channel, from which the communications device may perform the error measurements and modulation fidelity estimates. However, in some embodiments, the error measurements may be transmitted to the base station 31 (which may also include network computing/processing equipment) for performing the modulation fidelity determinations.

Figure 9:
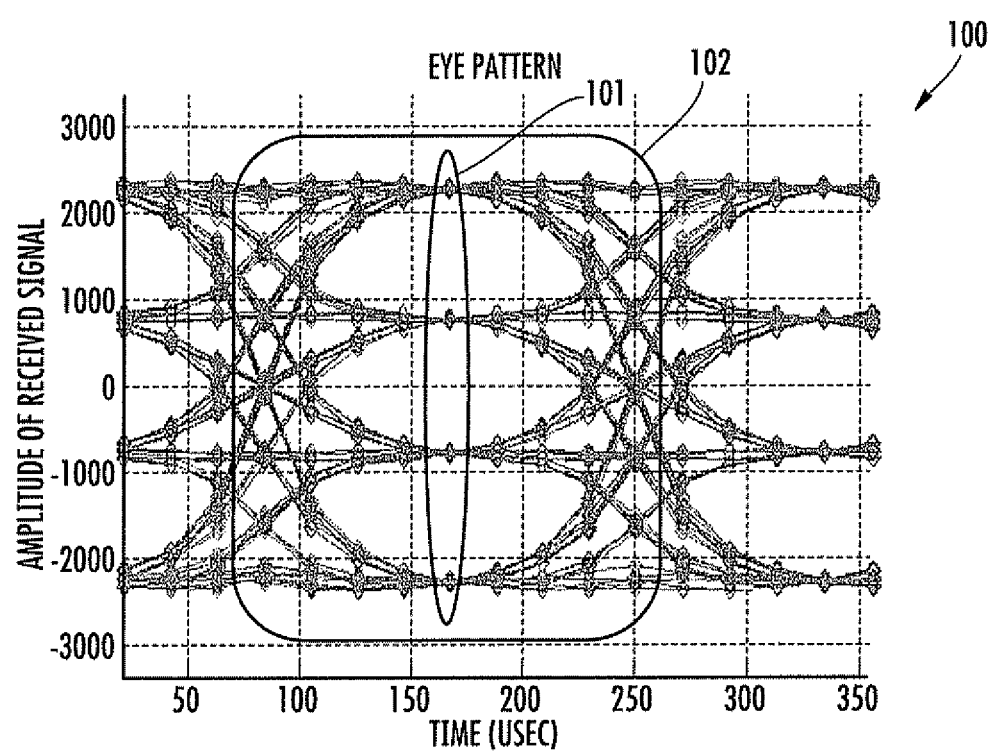
FIG. 9 is an eye diagram similar to that of FIG. 4 showing sampling positions for frequency error measurements in cases where symbol synchronization is known and unknown for sampled signals from the system of FIG. 1.

Referring additionally to the eye pattern diagram 100 of FIG. 9, when symbol synchronization information is known, the center point of the eye is accordingly known, and the frequency deviation error values (e.g., RMS error) occurring at this location (there are four in FIG. 9, which are within the boundary 101) may be averaged to determine a modulation fidelity value. One exemplary averaging formula is as follows:

$$MF=\text{mean}[\text{abs}(\text{measured\_}FM-\text{closest\_symbol\_}FM)] \quad (1)$$

where MF is the modulation fidelity value, and error values are determined based upon the mean of absolute error values of a difference between measure FM values (measured_FM) and the expected ideal FM values (i.e., closest_symbol_FM which are known apriori based on the ideal characteristics of the transmitted modulation). However, it will be appreciated that a median or other averaging value may be used in some applications. Another approach that may be used for determining modulation fidelity is based upon error vector magnitudes, as will be appreciated by those skilled in the art.

With continued reference to FIG. 9, in those cases where symbol synchronization information is not known, modulation fidelity estimates may be determined on each decimated set of FM values for each of a plurality of sample positions, which are within the boundary 102. In the illustrated example, there are eight sample points per transmitted symbol. An exemplary formula for modulation fidelity determination where symbol synchronization information is not known is as follows:

$$MF(k)=\text{mean}[\text{abs}(\text{measured\_}FM(k)-\text{closest\_symbol\_}FM)] \quad (2)$$

where k is the offset in the symbol sample position. In this case, the final modulation fidelity may be considered as the minimum over each of the different sample positions (i.e., the minimum modulation fidelity value is used, which will occur at the symbol sample point where the RMS frequency deviation error is lowest).

Figure 10:
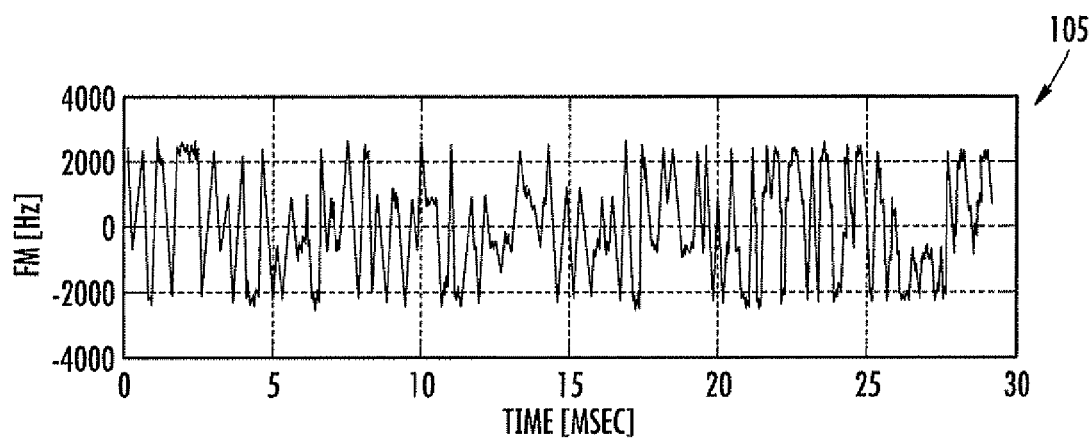
FIG. 10 is a graph of frequency modulation vs. time illustrating a demodulated FM signal over a measurement time interval for the system of FIG. 1.
Figure 11:
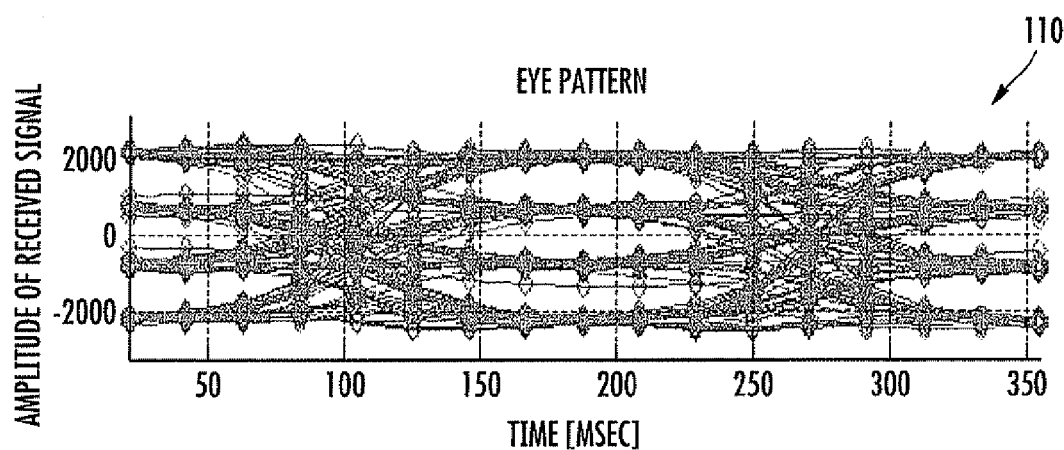
FIG. 11 is an eye pattern diagram showing received signal amplitude vs. time for the demodulated FM signal of FIG. 10 over the measurement time interval for sampled signals from the system of FIG. 1.

As noted above, a significant advantage of using modulation fidelity for roaming or channel switching decisions is that modulation fidelity may be determined over a relatively short time interval. As seen in FIG. 10, demodulated FM values may be calculated over a 30 ms interval, for example, or less. The corresponding eye pattern diagram 110 is shown in FIG. 11. In this example, the estimated receive modulation fidelity is approximately 150 Hz. Since received modulation fidelity may be estimated over a relatively short time duration, the system 30 may advantageously quickly assess adjacent channel conditions without acquiring symbol synchronization. Moreover, the average modulation fidelity estimate may be determined over the selected time interval to reduce estimate variance in some applications, if desired.

In some embodiments, it may also be desirable to use measured RSSI values, in conjunction with the modulation fidelity estimates, for channel switching determinations. In accordance with one exemplary approach, RSSI values may optionally be determined for the current and alternate channels, at Block 43. The communications device 32 may exclude from switching consideration those alternate channels that do not have a modulation fidelity value corresponding to a delivered audio quality (DAQ) threshold, at Block 44. For example, a DAQ threshold of 3.4 may be required in P25 applications, which corresponds to a modulation fidelity value of approximately 165 Hz or less. Accordingly, alternate channels having a modulation fidelity value of 165 Hz or less would be eligible for channel switching, while those with modulation fidelity values of greater than 165 Hz would not be considered for channel switching.

Furthermore, if RSSI is to be taken into consideration, for those channels with estimated modulation fidelity that meet the above-noted DAQ requirements, the one with the highest RSSI value may then be selected to be switched to as the new current channel for communications between the base station 31 and the communications device 32, at Blocks 45-46. The highest RSSI value indicates the strongest signal and, typically, the base station 30 that is in closest proximity to the communications device 32. It should be noted, however, that modulation fidelity may be used as the basis for channel switching without consideration of RSSI in some embodiments. A search for alternate channels may be triggered by the DAQ requirements for the current channel not being met, for example, or this may be done on a scheduled or periodic basis to continuously utilize the best available channel, depending upon the given implementation.

The channel switching determination may be made by the base station 31 based upon modulation fidelity information provided by the communication device 32 (e.g., over the control channel). That is, the base station 32 may determine when channel switching is appropriate based upon the above-described criteria, and inform the communication device 32 of the given alternate channel that it is to switch to for subsequent data communications. However, in most implementations the communications device 31 will be configured to perform the alternate channel selection and switch over to the alternate channel as the new current channel for data communication. Moreover, it should also be noted that, as used herein, channel switching also refers to handoffs between different base stations. That is, an alternate channel may be provided by a different base station. In this regard, a plurality of base stations 31 may also communicate with one another (either via wired or wireless network connections) to coordinate roaming or handoff operations, as will be appreciated by those skilled in the art, based upon the modulation fidelity estimates from the various channels.

Figure 12:
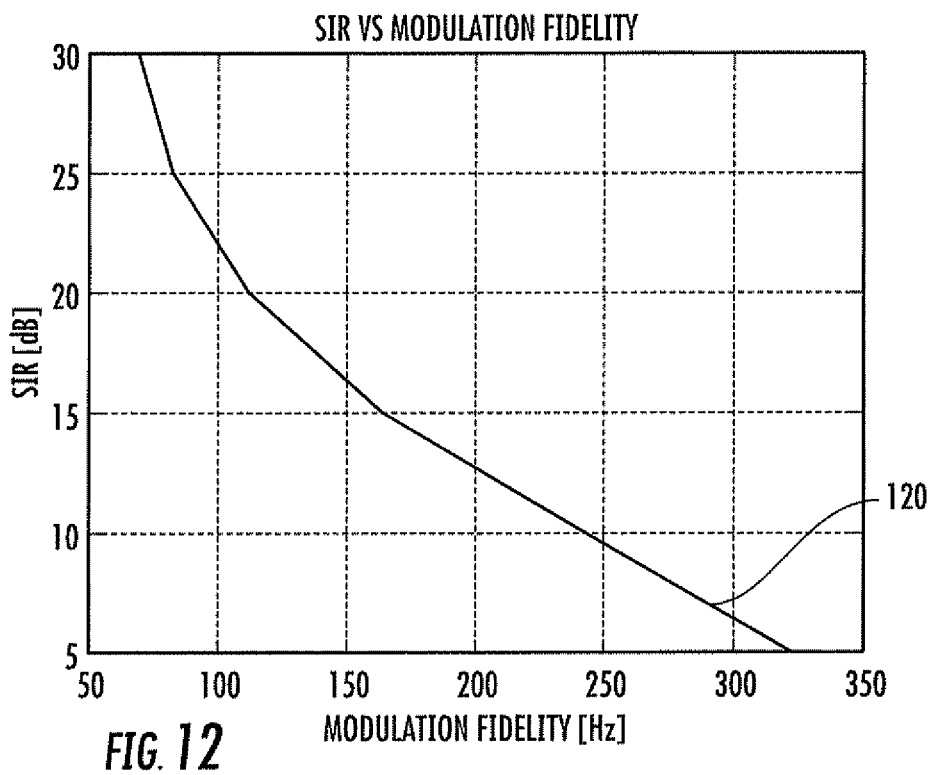
FIG. 12 is a graph of signal interference ratio vs. modulation fidelity for the system of FIG. 1.
Figure 13:
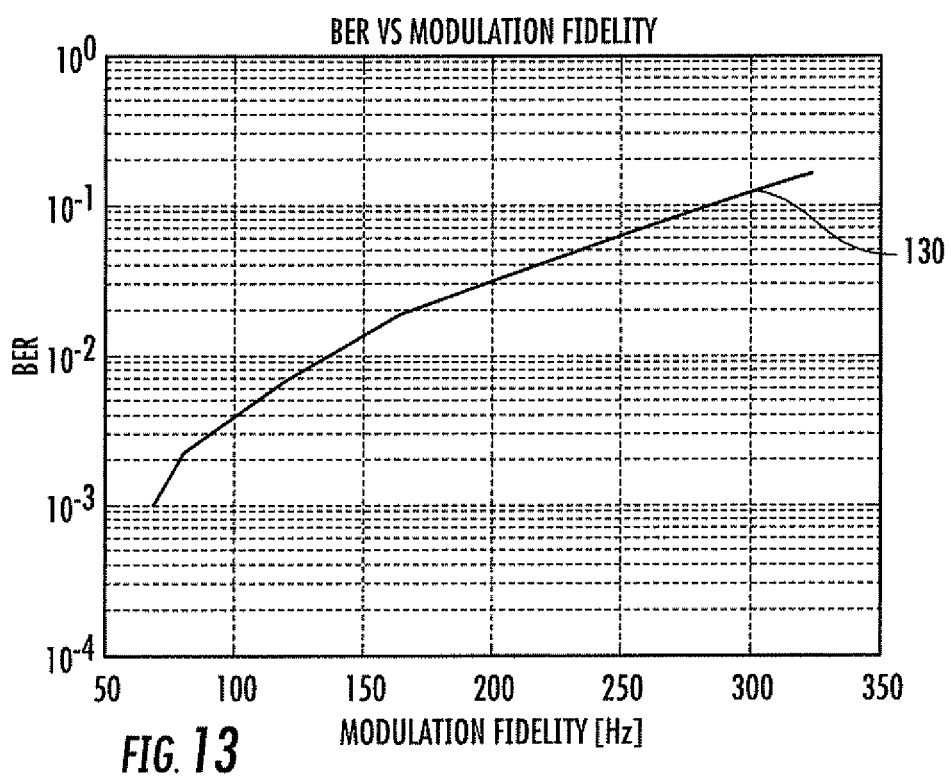
FIG. 13 is a graph of BER vs. modulation fidelity for the system of FIG. 1.

Referring now additionally to FIGS. 12 and 13, another advantage of the modulation fidelity determination is that it may also be used to provide a BER estimate, but without the above-described drawbacks associated with traditional BER measurement and estimation. More particularly, in FIG. 12 a plot 120 of the relationship between the S/I ratio (SIR) and modulation fidelity is shown, and in FIG. 13 a plot 130 of the relationship between BER and modulation fidelity is shown. Accordingly, using such plots or corresponding look-up tables, when a given modulation fidelity value is estimated, a corresponding BER (or SIR) may advantageously be provided. Table 1 (below) includes select example look-up values for a P25 phase 1 system is provided below.

TABLE 1

| DAQ | BER | Modulation Fidelity [Hz] |
|---|---|---|
| 4 | <1% | <135 |
| 3.4 | <2% | <165 |
| 3.0 | <2.6% | <185 |

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications system comprising:
    a base station; and
    a communications device configured to communicate with said base station via a plurality of different wireless communications channels using a modulation standard wherein a received modulation differs from a transmitted modulation as measured by a modulation fidelity value;
    said base station and said communications device being configured to cooperate to
        determine respective modulation fidelity values associated with a current channel and an alternate channel based upon a root mean square (RMS) frequency error between the received modulation and the transmitted modulation for the current channel and the alternate channel, and
        selectively switch between the current channel and the alternate channel based upon the determined modulation fidelity values,
        wherein the respective modulation fidelity values are determined based upon frequency modulation values for known signal points when symbol synchronization information is known, and based upon frequency modulation values for a plurality of sample positions when the symbol synchronization information is unknown.

2. The wireless communications system of claim 1 wherein said base station and said communications device are configured to further cooperate to determine the modulation fidelity values based upon an RMS frequency deviation error which corresponds to a modulation fidelity estimate.

3. The wireless communications system of claim 1 wherein said base station and said communications device are further configured to cooperate to generate a bit error rate (BER) estimate for the current channel based upon the respective determined modulation fidelity value.

4. The wireless communications system of claim 1 wherein said base station and said communications device are further configured to cooperate to determine RMS frequency deviation errors based upon an average of measured frequency deviation errors at the known signal points when the symbol synchronization information is known, or the sample positions when the symbol synchronization information is unknown.

5. The wireless communications system of claim 1 wherein said base station and said communications device are further configured to cooperate to determine the modulation fidelity values based upon error vector magnitudes (EVMs).

6. The wireless communications system of claim 1 wherein said base station and said communications device are further configured to cooperate to determine a respective received signal strength indicator (RSSI) for the current channel and the alternate channel, and to selectively switch between the current channel and the alternate channel also based upon the determined RSSIs.

7. The wireless communications system of claim 1 wherein said base station and said communications device are further configured to cooperate to selectively switch between the current channel and the alternate channel based upon a delivered audio quality (DAQ) threshold.

8. The wireless communications system of claim 1 wherein said base station and said communications device are configured to cooperate to use Project 25 Phase 2 harmonized differential quadrature phase shift keyed modulation (HDQPSK) as the modulation standard.

9. A communications device comprising:
a wireless radio frequency (RF) transceiver configured to communicate with a base station via a plurality of different wireless communications channels using a modulation standard wherein a received modulation differs from a transmitted modulation as measured by a modulation fidelity value; and
a controller configured to cooperate with the base station to
determine respective modulation fidelity values associated with a current channel and an alternate channel based upon a root mean square (RMS) frequency deviation error between the received modulation and the transmitted modulation for the current channel and the alternate channel, and
selectively switch between the current channel and the alternate channel based upon the determined modulation fidelity values,
wherein the respective modulation fidelity values are determined based upon frequency modulation values for known signal points when symbol synchronization information is known, and based upon frequency modulation values for a plurality of sample positions when the symbol synchronization information is unknown.

10. The communications device of claim 9 wherein said controller is configured to cooperate with the base station to further determine the modulation fidelity values based upon an RMS frequency deviation error which corresponds to a modulation fidelity estimate.

11. The communications device of claim 9 wherein said controller is configured to cooperate with the base station to generate a bit error rate (BER) estimate for the current channel based upon the respective determined modulation fidelity value and a calibration curve.

12. A communications method comprising:
causing a communications device to communicate with a base station via a current wireless communications channel selected from among a plurality of different wireless communications channels using a modulation standard wherein a received modulation differs from a transmitted modulation as measured by a modulation fidelity value;
determining respective modulation fidelity values associated with the current channel and an alternate channel based upon a root mean square (RMS) frequency error between the received modulation and the transmitted modulation for the current channel and the alternate channel, wherein the respective modulation fidelity values are determined based upon frequency modulation values for known signal points when symbol synchronization information is known, and based upon frequency modulation values for a plurality of sample positions when the symbol synchronization information is unknown; and
selectively switching between the current channel and the alternate channel based upon the determined modulation fidelity values.

13. The method of claim 12 wherein determining comprises determining the modulation fidelity values based upon an RMS frequency deviation error which corresponds to a modulation fidelity estimate.

14. The method of claim 12 further comprising generating a bit error rate (BER) estimate for the current channel based upon the respective determined modulation fidelity value and a calibration curve.

\* \* \* \* \*